(12) United States Patent
Kobayashi et al.

(10) Patent No.: US 9,376,543 B2
(45) Date of Patent: Jun. 28, 2016

(54) THERMOSETTING FURAN RESIN COMPOSITION AND FURAN RESIN LAMINATED BODY USING THE SAME

(71) Applicant: SEKISUI CHEMICAL CO., LTD., Osaka (JP)

(72) Inventors: Tomoyuki Kobayashi, Kyoto (JP); Shigeru Ogasawara, Kyoto (JP); Haruki Katata, Kyoto (JP); Yukihiro Hara, Kyoto (JP); Michitaka Tsujimoto, Kyoto (JP); Satoshi Nishijima, Kyoto (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/387,756

(22) PCT Filed: Mar. 21, 2013

(86) PCT No.: PCT/JP2013/058086
§ 371 (c)(1),
(2) Date: Sep. 24, 2014

(87) PCT Pub. No.: WO2013/146534
PCT Pub. Date: Oct. 3, 2013

(65) Prior Publication Data
US 2015/0051331 A1   Feb. 19, 2015

(30) Foreign Application Priority Data

Mar. 26, 2012 (JP) .................... 2012-069905

(51) Int. Cl.
| | |
|---|---|
| A61B 3/00 | (2006.01) |
| C08K 3/30 | (2006.01) |
| C08K 3/16 | (2006.01) |
| C08K 3/20 | (2006.01) |
| C08L 61/00 | (2006.01) |
| C08G 16/02 | (2006.01) |
| C08K 9/06 | (2006.01) |

(52) U.S. Cl.
CPC .............. *C08K 3/30* (2013.01); *C08G 16/0262* (2013.01); *C08K 3/16* (2013.01); *C08K 3/20* (2013.01); *C08K 9/06* (2013.01); *C08L 61/00* (2013.01); *C08K 2003/3045* (2013.01)

(58) Field of Classification Search
CPC .............. C08K 3/30; C08K 3/16; C08K 3/20; C08L 61/00; C08G 16/0262
See application file for complete search history.

(56) References Cited

U.S. PATENT DOCUMENTS

| | | | |
|---|---|---|---|
| 5,635,583 A * | 6/1997 | Motter et al. ................. | 528/243 |
| 5,932,628 A | 8/1999 | Kiuchi et al. | |
| 2005/0282973 A1* | 12/2005 | Nguyen et al. ................ | 525/410 |
| 2008/0207833 A1* | 8/2008 | Bear et al. .................... | 525/190 |
| 2012/0289651 A1 | 11/2012 | Kato et al. | |

FOREIGN PATENT DOCUMENTS

| | | | |
|---|---|---|---|
| EP | 2554359 A1 | 2/2013 | |
| EP | 2752258 A1 | 9/2014 | |
| JP | 05-059256 A | 3/1993 | |
| JP | 05-255572 A | 10/1993 | |
| JP | 07-286053 A | 10/1995 | |
| JP | 08-057577 A | 3/1996 | |
| JP | 09-208316 A | 8/1997 | |
| JP | 10-265648 A | 10/1998 | |
| JP | 2000-302944 A | 10/2000 | |
| JP | 2000-319345 A | 11/2000 | |
| JP | 3219769 B2 | 10/2001 | |
| JP | 2003-055534 A | 2/2003 | |
| JP | 2009-173762 A | 8/2009 | |
| JP | 2011224592 A | 11/2011 | |
| SU | 765317 * | 9/1980 | ............. C08L 61/10 |
| WO | 94/18187 A1 | 8/1994 | |
| WO | 2010013629 A1 | 2/2010 | |
| WO | 2011/078082 A1 | 6/2011 | |
| WO | 2011125534 A1 | 10/2011 | |
| WO | 2013031947 A1 | 3/2013 | |

OTHER PUBLICATIONS

Machine translation of SU 765317. Sep. 1980.*
International Search Report of PCT/JP2013/058086 dated Jun. 4, 2013.
International Preliminary Report on Patentability issued Oct. 9, 2014 in PCT/JP2013/058086.
European Search Report of PCT/JP2013058086 dated Oct. 16, 2015.
Database WPI Week 201012 Thomson Scientific AN2010-B37105 XP002745604, 2010.
Database WPI Week 201176 Thomson Scientific AN2011-N76967 XP002745603, 2011.

* cited by examiner

*Primary Examiner* — John Uselding
(74) *Attorney, Agent, or Firm* — Sughrue Mion, PLLC

(57) ABSTRACT

A thermosetting furan resin composition comprising furan based resin (A), curing catalyst (B), and additive (C) that is a normal salt including a strong acid and a strong base is offered. The abovementioned additive (C) preferably has a solubility in water of 30 g/100 g H2O at 20° C. Furthermore, the abovementioned additive (C) is at least one selected from the group consisting of sodium chloride, potassium chloride, lithium chloride, sodium bromide, potassium bromide, lithium bromide, sodium sulfate, potassium sulfate, lithium sulfate, sodium nitrate, potassium nitrate, and lithium nitrate, or a mixture thereof. The content of the abovementioned additive (C) is 0.2-10 parts by weight based on the aforementioned furan based resin (A) being 100 parts by weight.

14 Claims, No Drawings

THERMOSETTING FURAN RESIN COMPOSITION AND FURAN RESIN LAMINATED BODY USING THE SAME

CROSS REFERENCE TO RELATED APPLICATIONS

This is a National Stage of Application No. PCT/JP2013/058086 filed Mar. 21, 2013, which claims priority from Japan Patent Application No. JP 2012-069905, filed Mar. 26, 2012. The entire disclosures of which are hereby incorporated by reference.

TECHNICAL FIELD

The present invention relates to thermosetting furan resin compositions and furan resin laminated body using the same, more specifically, thermosetting furan resin compositions with small dimensional change after thermosetting and furan resin laminated body using the same.

BACKGROUND ART

Conventionally, thermosetting furan resin compositions with the main component furan resin has furfuryl alcohol and furfural as raw materials, and since the cured product has excellent in heat resistance, solvent resistance and chemical resistance, it is used in various industrial fields as a matrix resin for laminates and composites such as steel pipe linings, joint cement, FRP, and the like.

Nevertheless, there is a problem in that there is substantial dimensional change in conventional thermosetting furan resin compositions due to dispersal of the water content derived from the condensation reaction during synthesis of the furan resin, and of the generated water derived from the curing reaction.

Based thereupon, a method proposed for reducing the water content (See Patent Document 1) is the removal by distillation of the water from the furan resin condensation when the synthesis is complete.

However, in this method, the viscosity of the furan resin increases exponentially with decreasing water content, and it is difficult to ensure the impregnation essential for the laminated body matrix resin.

On the other hand, after removal by distillation of the water from the condensation after the synthesis is completed, dilution with furfuryl alcohol or furfural is considered to be a method that reduces the viscosity while preventing dimensional change.

Nevertheless, it is necessary in this method to add large amounts of the volatile monomers of furfural and furfuryl alcohol, and deterioration of the working environment due to dispersal of the monomer becomes a significant problem.

Furthermore, preventing dimensional change due to dispersal of the generated water from the curing reaction in these methods was difficult.

CITATION LIST

Patent Literature

<Patent Document 1> Japanese Patent Publication No. JP3219769

SUMMARY OF THE INVENTION

Technical Problem

Taking account of the problem of the abovementioned background art, the object of the present invention is to provide a thermosetting furan resin composition with small dimensional change after curing, and a furan resin laminated body comprising the same.

Solution to Problem

As the result of diligent study of the abovementioned problem, the present inventors have discovered that the abovementioned problem can be solved by using a thermosetting furan resin composition comprising a furan resin, curing catalyst, and additive, wherein the abovementioned additive is a normal salt comprising a strong acid and a strong base, and furthermore through the use of a furan resin laminated body employing the same, thus being able to accomplish the present invention.

Specifically, according to the first aspect of the present invention, a thermosetting furan resin composition is offered, comprising furan based resin (A), curing catalyst (B), and additive (C) that is a normal salt comprising a strong acid and a strong base.

Moreover, according to a second aspect of the present invention, the thermosetting furan resin composition in the first aspect is offered wherein the additive (C) has a solubility in water of 30 g/100 g H2O or greater at 20° C.

Furthermore, according to a third aspect of the present invention, the thermosetting furan resin composition in the first aspect or the second aspect is offered wherein the additive (C) is at least one selected from the group consisting of sodium chloride, potassium chloride, lithium chloride, sodium bromide, potassium bromide, lithium bromide, sodium sulfate, potassium sulfate, lithium sulfate, sodium nitrate, potassium nitrate, and lithium nitrate, or a mixture thereof.

Additionally, according to a fourth aspect of the present invention, the thermosetting furan resin composition in any one of the first through third aspects is offered wherein the content of the additive (C) is 0.2-10 parts by weight based on the furan based resin (A) being 100 parts by weight.

Moreover, according to a fifth aspect of the present invention, the thermosetting furan resin composition in any one of the first through fourth aspects is offered wherein the water content of the thermosetting furan resin composition is 15 wt % or less.

In addition, according to a sixth aspect of the present invention, the thermosetting furan resin composition in any one of the first through fifth aspects is offered wherein the furan resin has a viscosity of 100-5000 mPa·s at 25° C.

According to this aspect, it is possible to ensure impregnation at low viscosity in a furan resin (A) wherein the water content generated during the curing reaction is decreased and dimensional change in the cured product can be prevented.

Additionally, according to a seventh aspect of the present invention, the thermosetting furan resin composition in any one of the first through sixth aspects is offered wherein the furan based resin (A) has a water content of 10 wt % or less, and the total content of residual furfuryl alcohol and furfural is 1 weight % or less.

According to this aspect, it is possible for the furan based resin to comprise substantially no volatile monomer while the water content generated by the curing reaction is decreased and dimensional change in the cured product can be prevented.

Moreover, according to an eighth aspect of the present invention, the thermosetting furan resin composition in any one of the first through seventh aspects is offered wherein the curing catalyst (B) comprises a thermal reaction-type latent acid curing catalyst (B2) alone, or comprises a mixture of a manifest curing catalyst (B1) and the thermal reaction-type latent acid curing catalyst (B2).

According to this aspect, it is possible to obtain a long pot life derived from the latent curing catalyst.

In addition, according to a ninth aspect of the present invention, the thermosetting furan resin composition in the eighth aspect is offered wherein the reaction-type latent acid curing catalyst (B2) is of at least one type selected from the group consisting of inorganic ammonium salts, primary amine salts, secondary amine salts, and tertiary amine salts.

Additionally, according to a tenth aspect of the present invention, the thermosetting furan resin composition in the ninth aspect is offered wherein the thermal reaction-type latent acid curing catalyst (B2) is of at least one type selected from the group consisting of ammonium halides, ammonium sulfate, ammonium nitrate, methylammonium halides, dimethylammonium halides, ethylammonium halides, and diethylammonium halides.

Moreover, according to an eleventh aspect of the present invention, the thermosetting furan resin composition in any one of the first through tenth aspects is offered further comprising 5-100 parts by weight of an inorganic filler based on the furan based resin (A) being 100 parts by weight.

According to this aspect, it is possible to increase the mechanical strength of the composition after thermal curing due to its furthermore comprising a predetermined amount of inorganic filler.

In addition, according to a twelfth aspect of the present invention, the thermosetting furan resin composition in the eleventh aspect is offered wherein the pH of the inorganic filler is 10 or lower.

Moreover, according to a thirteenth aspect of the present invention, the thermosetting furan resin composition in the eleventh aspect or twelfth aspect is offered wherein the inorganic filler has been subjected to an organosilane surface treatment.

Additionally, according to a fourteenth aspect of the present invention, the thermosetting furan resin composition in any one of the first through thirteenth aspects is offered further comprising a defoaming agent.

According to this aspect, by further comprising the defoaming agent, it is possible for the mechanical strength of the composition after curing to be increased due to a decrease in number of bubbles remaining in the thermosetting furan resin composition.

In addition, according to a fifteenth aspect of the present invention, a furan resin laminated body is offered comprising a fibrous substrate and the thermosetting furan resin composition in any one of the first through fourteenth aspects being cured into a cured body after being impregnated into the abovementioned fibrous substrate.

Advantageous Effects of Invention

According to the thermosetting furan resin composition of the present invention, the effect is that the water content generated by the curing reaction can be reduced and dimensional change of the cured product can be prevented.

Moreover, according to the furan resin laminated body of the present invention, the thermosetting furan resin composition with low dimensional change can be impregnated onto a fibrous substrate with the effect that the laminated body will have low dimensional change after curing.

DESCRIPTION OF EMBODIMENTS

The thermosetting furan resin composition and furan resin laminated body using the same of the present invention are explained in specific detail below.

1. Thermosetting Furan Resin Composition

The thermosetting furan resin composition of the present invention comprises furan based resin (A), curing catalyst (B), and additive (C) that is a normal salt comprising a strong acid and a strong base. The thermosetting furan resin composition of the present invention preferably contains mainly furan based resin (A), curing catalyst (B), and additive (C) that is a normal salt comprising a strong acid and a strong base. In the present specification, "mainly contains" has the meaning preferably of 50-100 wt %, more preferably 60-100 wt %, and furthermore preferably 70-100 wt %

(1) Furan Based Resin (A)

In the present invention, the furan based resin (A) is preferably furan resin and modified furan resin.

Furan resins are polymers or precursors thereof (oligomers) having as one of the starting materials a furan or furan derivative with one or a plurality of reactive substituent groups on the furan ring, and examples of furan resin include furfuryl alcohol type, furfuryl alcohol-furfural condensation copolymer type, furfuryl alcohol-aldehyde condensation copolymer type, furfural-ketone condensation copolymer type, furfural-phenol condensation copolymer type, furfuryl alcohol-urea condensation copolymer type, furfuryl alcohol-phenol condensation copolymer type, or the like.

Any type of furan based resin (A) can be used, but due to its stable industrial supply, furfuryl alcohol type, or furfuryl alcohol-formaldehyde condensation copolymer type furan resins are preferred.

Examples of modified furan resins include furan resins on which modifications, such as epoxy-modified, phenol-modified, aldehyde-modified, urea-modified, melamine-modified, or the like, have been carried out.

During the formation of a laminated body, since there is a concern that the impregnation will be low if the viscosity of the furan based resin (A) is too high, and if the viscosity is too low there is a concern about the occurrence of sagging during the formation of a laminated body, at 25° C., 100-5000 mPa·s is preferred, 200-3000 mPa·s is further preferred, and 300-2000 mPa·s is most preferred.

Since the dimensional shrinkage will become greater due to water dispersal during curing if the water content of the furan based resin (A) is too large, 10 wt % or less (for example, 0.5-10 wt %) is preferred, 9% or less is further preferred, and 8% or less is particularly preferred.

Since there is a concern about deterioration of the working environment if the total content of residual furfuryl alcohol and furfural in the furan based resin (A) is too great, this is preferably 1 wt % or less (for example, 0.0001-1 wt %), and 0.8 wt % or less is further preferable.

(2) Curing Catalyst (B)

Without being limiting in any particular way, examples of the curing catalyst (B) for curing the furan based resin (A) include organic acids such as organic sulfonic acids, organic carboxylic acids, and the like, as well as such as aqueous solutions thereof, and inorganic acids such as hydrochloric acid, sulfuric acid, phosphoric acid, and the like, as well as such as aqueous solutions thereof.

Examples of organic sulfonic acids include para-toluenesulfonic acid, benzenesulfonic acid, xylenesulfonic acid, methanesulfonic acid, and the like. Examples of organic carboxylic acids include malonic acid, succinic acid, maleic acid, oxalic acid, acetic acid, lactic acid, malic acid, tartaric acid, benzoic acid, citric acid, and the like. The abovementioned examples of curing catalysts can be using singly and can also be used in combinations of two or more types.

With the aim of combining shortened curing time with pot life, it is preferable to use either a thermal reaction-type latent acid curing catalyst (B2) alone, or in combination with a manifest curing catalyst (B1).

Examples of manifest curing catalyst (B1) include organic acids such as organic sulfonic acids, organic carboxylic acids, and the like, as well as such as aqueous solutions thereof, and inorganic acids such as hydrochloric acid, sulfuric acid, and the like, as well as such as aqueous solutions thereof.

Without being limiting in any particular way, the thermal reaction-type latent acid curing catalyst (B2) can be anything that reacts with difficulty to a component contained in the furan based resin (A) at ambient temperatures and reacts rapidly when heated during curing to generate acid. From the perspective of stability at ambient temperatures and rapid reactivity due to heating during curing, the thermal reaction-type latent acid curing catalyst (B2) preferably contains at least one of any from among inorganic ammonium salts, primary ammonium salts, secondary ammonium salts, and tertiary ammonium salts Specifically, the thermal reaction-type latent acid curing catalyst (B2) more preferably contains at least one of any from among ammonium halides, ammonium sulfate, ammonium nitrate, methylammonium halides, dimethylammonium halides, ethylammonium halides, and diethylammonium halides. Examples of halides include chlorides, bromides, iodine, and the like. Among these, ammonium chloride, ammonium sulfate, ammonium nitrate, methylammonium chloride, dimethylammonium chloride, ethylammonium chloride, and diethylammonium chloride are furthermore preferably contained.

Without being limiting in any particular way, amount of the curing catalyst (B) that is added will be adjusted by the types and dilution concentrations of the furan based resin (A) and curing catalyst (B), and the target curing temperature/curing time, but this is preferably 0.5-10 parts by weight, and particularly preferably 1-8 parts by weight, based on the furan based resin (A) being 100 parts by weight. If it is less than 0.5 parts by weight, there might be a problem with inadequate curing. On the other hand, if it is more than 10 parts by weight, the pot life might be shorter.

(3) Additive (C)

Without being limiting in any particular way, if the additive (C) is a normal salt comprising a strong acid and a strong base, examples include sodium chloride, potassium chloride, lithium chloride, sodium bromide, potassium bromide, lithium bromide, sodium sulfate, potassium sulfate, lithium sulfate, sodium nitrate, potassium nitrate, and lithium nitrate, or the like. Persulfate salts such as sodium persulfate, potassium persulfate, ammonium persulfate, or the like, can also be added. Persulfate salts are also used as thermal reaction-type latent acid curing catalysts.

The additive (C) can be added as a solid, but addition of an aqueous solution is preferred due to the ease of dispersal into the furan resin. In this case, the more the dispersibility of the additive increases, the more it is possible to prevent dimensional change in the cured product, and the thermosetting furan resin composition can be obtained more easily and in fewer steps. Without being limiting in any particular way, the concentration of the aqueous solution of the additive can be adjusted according to the type of additive, addition temperature, the target dimensional precision, and the like, but if the concentration is too low, the added water content will be too high and the dimensional change will increase, so it is preferable to adjust the concentration to be in the vicinity of the solubility at the working temperature.

Since the solubility or dispersibility in the furan based resin (A) will worsen if the water solubility of the additive (C) is too low, it is preferable for the water solubility at 20° C. to be 30 g/100 g H2O or higher.

The additive (C) is preferably selected from among sodium chloride, lithium chloride, sodium bromide, and lithium bromide, or a mixture thereof, and from the dimensional change prevention effect and high solubility at ambient temperatures the most preferred is lithium chloride.

Without being limiting in any particular way, the types and water contents of the furan based resin (A) and curing catalyst (B), and the target dimensional precision, and the like, will determine the adjusted amount of the additive (C) that is added, but this is preferably 0.2-10 parts by weight, particularly preferably 0.5-5 parts by weight, and most preferably 1-3 parts by weight, based on the furan based resin (A) being 100 parts by weight. If it is less than 0.2 parts by weight, it might not be possible to obtain an adequate dimensional change prevention effect, and if it is more than 10 parts by weight, the viscosity during mixing with the furan based resin (A) might be too high.

Since there is a concern that the impregnation during the formation of a laminated body might be low if viscosity of the thermosetting furan resin composition of the present invention is too high, and if, on the other hand, it is too low, there is a concern about the occurrence of sagging during the formation of a laminated body, at 25° C., 100-10,000 mPa·s is preferred, 100-3000 mPa·s is further preferred, and 100-3500 mPa·s is most preferred.

Since the dimensional shrinkage will become greater due to water dispersal during curing if the water content of the thermosetting furan resin composition is too large, 15 wt % or less (for example, 0.5-15 wt %) is preferred, 12 wt % or less is further preferred, and 10 wt % or less is particularly preferred.

(4) Other Additives

With the aim of increasing the strength characteristics, it is preferable to add an inorganic filler to the thermosetting furan resin composition. Without being limiting in any particular way, if the inorganic filler has a high elastic modulus and is highly fillable, from the perspective of preventing curing inhibition, the pH of the inorganic filler is preferably 10 or below. Specifically, glass powder, silica, talc, kaolin, mica, aluminum hydroxide, and the like, are preferred, and kaolin, silica, and aluminum hydroxide are the most preferred from the cost perspective. For the pH of an inorganic filler, 0.5 g of an inorganic filler is placed in a 100 mL erlenmeyer flask with stopper, and after 100 mL distilled water is added the flask is sealed with the stopper. This is stirred at the rate of 600 rpm of the rotation speed with a stirrer in a 23±5° C. medium for 24 h and extracted, the supernatant after being allowed to stand is measured according to JIS Z8802 (Method for Determining pH) to give the pH determination.

With the aim of increasing the interfacial adhesion of the furan based resin (A), it is preferable to carry out a surface treatment on the inorganic filler. Without being limiting in any particular way, if a reaction or bonding between the inorganic filler and the furan based resin (A) is possible, a surface treatment with an organosilane as the surface treatment agent facilitates the formation of bonds and is preferred, specifically, an aminosilane surface treatment agent, epoxysilane surface treatment agent, or acrylic silane surface treatment agent is the most preferred.

The amount of inorganic filler added will change depending on the viscosity of the furan based resin (A), since the strength characteristic-increasing effect cannot be obtained if it is too low, while if the amount of inorganic filler added is too much on the other hand, this might lead to the occurrence of low impregnation of the substrate because of the increased viscosity. For these reasons, 5-100 parts by weight is preferred, 10-80 parts by weight is further preferred, and 10-60 parts by weight is most preferred, based on the furan based resin (A) being 100 parts by weight.

With the aim of defoaming during mixing of the thermosetting furan resin composition, it is preferable to add a defoaming agent to the thermosetting furan resin composition. The types of defoaming agents include silicone defoaming agents such as oil-type silicone defoaming agents, emulsion-type silicone defoaming agents, and the like; foam-destroying polymer-type defoaming agents such as non-ionic polyethers, and the like; specialty non-ionic surfactants; polyether-modified methylalkylpolysiloxane copolymers; polyethylene glycol-type non-ionic surfactants; along with plant oil-derived defoaming agents, and the like; particularly preferred are silicone defoaming agents such as oil-type silicone defoaming agents, emulsion-type silicone defoaming agents; and foam-destroying polymer-type defoaming agents. Defoaming agents can be used singly, or two or more types can be used in combination. These additives are preferably present as 0.0001 parts by weight to 1 part by weight, based on the furan based resin (A) being 100 parts by weight.

Without being limiting in any particular way, the method for mixing thermosetting furan resin compositions is, for example, the stirring mixing method using a Homogenizing Disper.

From the perspectives of adjusting the viscosity and adjusting the reactivity, the thermosetting furan resin compositions of the present invention can include a reactive diluent. In this regard, the reactive diluent will be anything as long as it has low viscosity and compatibility with furan resins, and as long as reaction-solidification takes place when the thermosetting furan resin composition is cured, without being limiting in any particular way, for example, furfuryl alcohol alone, furfural alone, or mixtures of furfuryl alcohol and furfural are preferred.

The reactive diluent content will differ depending on the type of reactive diluent and the viscosity of the furan resin, but since there is a concern that the impregnation of the substrate will be less if there is too little, and on the other hand there is a concern about the occurrence of sagging following impregnation of the substrate if there is too much, 10-130 parts by weight is preferable, 10-110 parts by weight is more preferable, 20-90 parts by weight is furthermore preferable, and 40-80 parts by weight is the most preferable, based on the furan-based resin (A) being 100 parts by weight.

An example of a manufacturing method for the thermosetting furan resin compositions of the present invention has an additive addition step wherein at least one additive (C) selected from the group consisting of sodium chloride, lithium chloride, sodium bromide, and lithium bromide is added to the furan based resin (A), and a curing catalyst addition step wherein the curing catalyst (B) is added to the furan based resin (A).

In the additive addition step, the additive (C) can be added as a powder and can also be added as a solution. The addition of the additive (C) as a solution is especially preferable due to the easy dispersal into furan based resin (A). Examples of solvents include water, methanol, ethanol, and mixtures thereof, and the like. Among these, from the perspective of adding sodium chloride, lithium chloride, sodium bromide, and lithium bromide uniformly, aqueous solutions with water as the solvent are preferred.

Without being limiting in any particular way, the concentration of additive (C) in the solutions or fluid dispersions can be adjusted depending on the type of additive (C), solvent, addition temperature, the target dimensional precision, and the like. For addition as an aqueous solution, since a large amount of water is added for an aqueous solution with low concentration and dimensional change will thus become large, it is preferable to adjust to the vicinity of the saturation solubility at the working temperature. The preferred concentration of the aqueous solution is such that the water content added to the composition as an aqueous solution is 10 parts by weight or less (e.g., 0.5-10 parts by weight) based on the furan based resin (A) being 100 parts by weight. The concentration of the aqueous solution, for example, in the case of sodium chloride can be approx. 10-25 wt %, and in the case of lithium chloride can be approx. 30-45 wt %.

In the curing catalyst addition step, the curing catalyst (B) is added to the furan based resin (A), and is mixed using a stirrer or the like.

2. Furan Resin Laminated Body

The furan resin laminated body of the present invention is obtained by that the above-mentioned furan resin composition is impregnated onto the fibrous substrate and is cured thermally.

Examples of fibrous substrates include woven products comprising organic fibers such as paper, cotton, linen, or the like, or non-woven fabrics, chopped strand mats, roving cloth, or the like.

Examples of non-woven fabric materials with high strength and high elasticity include polyesters, high density polyethylene (HDPE), polypropylene, and the like, and among these resins are preferable, moreover porous materials that have flexibility can be used such as, for example, felt, mat, spunbond, webbing, or the like, prepared from continuous filaments or staple fibers.

For chopped strand mats, for example, it is preferable after strands of glass fibers or the like are cut to a predetermined length and then dispersed into a mat shape, an adhesive such as a thermoplastic resin is applied uniformly and hot-melted to adhere the paired strands together.

For roving cloth, glass fibers, carbon fibers, aramid fibers, inorganic fibers, organic fibers, whiskers, metallic fibers or the like are preferable, and among these glass fibers are more preferable to balance the strength of the fiber reinforced resin layer obtained with the cost. Moreover, the reinforced fibers preferably have a fiber diameter in the range of 3-25 μm, while a fiber diameter 5-20 μm is more preferred from the perspectives of strength and cost.

An example of a method for the impregnation of the thermosetting furan resin composition onto a fibrous substrate, without being limiting in any particular way, is the method wherein the thermosetting furan resin composition is impregnated onto reinforced fibers using an impregnating roll, or the like.

An example of a curing method for the thermosetting furan resin composition impregnated onto a fibrous substrate, without being limiting in any particular way, is the thermal curing method wherein the thermosetting furan resin composition-impregnated fibrous substrate is placed in a container or mold of a predetermined shape, and is thermally cured by hot air or by being sandwiched between hot plates. Generally, the temperature during the thermal curing of the thermosetting furan resin composition of the abovementioned present invention, without being limiting in any particular way, is preferably 70-130° C.

By using the thermosetting furan resin composition with little dimensional change as mentioned above, the furan resin laminated body with little dimensional shrinkage of the present invention can easily be provided after curing. Consequently, according to the present invention, it is possible to manufacture a furan resin laminated body of good quality at low cost, which can be particularly well suited for use in applications such as FRP and the like.

WORKING EXAMPLES

Working examples are used below to explain the present invention in greater detail, but the present invention is not limited in any way to these examples.

The methods employed to measure physical properties in the present invention are shown below.

(1) Dimensional Retention

The dimensional measurement was made after making a 100 mm×100 mm cut from a molded furan resin laminated body, and after curing for 100 hours in a thermostatic chamber at 25° C. (humidity 50%), a comparison was made based on the following formula to determine the dimensional retention.

Dimensional retention (%)=(dimensions after 100 h (mm)/dimensions after cutting (mm))×100

(2) Weight Retention

The weight measurement was made after making a 100 mm×100 mm cut from a molded furan resin laminated body, and after curing for 100 hours in a thermostatic chamber at 25° C. (humidity 50%), a comparison was made based on the following formula to determine the weight retention.

Weight retention (%)=(weight after 100 h (g)/weight after cutting (g))×100

(3) Impregnation

After uniform impregnation of the thermosetting furan resin composition onto the fibrous substrate using an impregnating roll, a relative evaluation was made of the time to permeation from the front surface to the back surface vs. comparative example 1.

(4) Monomer Dispersal

After uniform impregnation of the thermosetting furan resin composition onto the fibrous substrate using an impregnating roll, a relative evaluation was made of the monomer odor vs. comparative example 1.

(5) Pot Life (Pot Life Period)

After 20 g thermosetting furan resin composition was placed in a sealable glass container which 20 mm inner diameter and 50 mm in height, this was placed in a 30° C. environment and the presence/absence of flowability was checked every hour, with the time measured when there was no more flowability.

(6) Flexural Modulus

The flexural modulus of the molded furan resin laminated body was measured according to JIS K7171 (Plastics—Method for Determining Flexural Properties).

Preparation of Thermosetting Furan Resin Compositions

Working Examples 1-5

Based on 100 parts by weight of a furan based resin comprising a furfuryl alcohol/formaldehyde condensation copolymer (viscosity: 2000 mPa·s; water content: 6 wt %; total residual furfuryl alcohol/furfural content: 0.4 wt %), the amount of additive shown in Table 1 was added, and this was stirred for 5 min at 500 rpm using a Homogenizing Disper. After stirring, the curing catalyst was added, and this was stirred again at 500 rpm for 3 min to obtain the thermosetting furan resin composition.

Working Examples 6-7

Based on 100 parts by weight of a furan resin comprising a furfuryl alcohol/formaldehyde condensation copolymer (viscosity: 2000 mPa·s; water content: 6 wt %; total residual furfuryl alcohol/furfural content (FA/FL): 0.4 wt %), the amount of additive aqueous solution shown in Table 2 was added, and this was stirred for 5 min at 500 rpm using a Homogenizing Disper. After stirring, the curing catalyst was added, and this was stirred again at 500 rpm for 3 min to obtain the thermosetting furan resin composition.

Working Examples 8-10

Based on 100 parts by weight of a furan based resin comprising a furfuryl alcohol/formaldehyde condensation copolymer (viscosity: 2000 mPa·s; water content: 6 wt %; total residual furfuryl alcohol/furfural content: 0.4 wt %), the amounts of additive aqueous solution, filler, and defoaming agent shown in Table 2 were added, and this was stirred for 5 min at 500 rpm using a Homogenizing Disper. After stirring, the curing catalyst was added, and this was stirred again at 500 rpm for 3 min to obtain the thermosetting furan resin composition.

Comparative Examples 1-3

Based on 100 parts by weight of a furan based resin comprising the furfuryl alcohol/formaldehyde condensation copolymer composition shown in Table 1, the curing catalyst was added, stirred at 500 rpm for 3 min to obtain the thermosetting furan resin composition.

(Molding the Furan Resin Laminated Body)

After the thermosetting furan resin composition described above (8400 g/m2) was impregnated uniformly onto a polyester non-woven substrate (thickness 5 mm, coating weight 1000 g/m2) using an impregnating roll, this was placed in a mold of inner dimensions 240 mm×240 mm×5 mm, and this was cured at 90° C. for 12 h to give the furan resin laminated body.

Evaluations were carried out on the furan resin laminated bodies obtained from the above-described working examples and comparative examples. The evaluation results are shown in Table 1 and Table 2. Furthermore, in the tables, the unit "phr" is the parts by weight relative to the furan based resin (A) being 100 parts by weight.

TABLE 1

| | Parameter | Units | Comparative Example 1 | Comparative Example 2 | Comparative Example 3 | Working Example 1 | Working Example 2 | Working Example 3 | Working Example 4 | Working Example 5 |
|---|---|---|---|---|---|---|---|---|---|---|
| Furan based resin (A) | Viscosity | mPa·s | 2000 | 6000 | 2000 | 2000 | 2000 | 2000 | 2000 | 2000 |
| | Water content | — | 6% | 3% | 3% | 6% | 6% | 6% | 6% | 6% |
| | FA/FL content | — | 0.4% | 0.4% | 20.0% | 0.4% | 0.4% | 0.4% | 0.4% | 0.4% |
| Curing catalyst (B) | p-Toluenesulfonic acid, 65% aqueous solution | phr | 1.0 | 1.0 | 1.0 | 1.0 | 1.0 | 1.0 | 1.0 | 1.0 |
| Additive (C) | Type | — | None | None | None | $Na_2SO_4$ | NaCl | LiCl | NaBr | LiBr |
| | Solubility (20° C.) | g/100 g | — | — | — | 19.5 | 35.5 | 83.5 | 90.8 | 160 |
| | Addition method | — | — | — | — | Powder | Powder | Powder | Powder | Powder |
| | Amt. added | phr | — | — | — | 2 | 2 | 2 | 2 | 2 |
| Evaluation results | Dimensional retention | — | 98.7% | 99.0% | 99.2% | 99.5% | 99.7% | 99.8% | 99.7% | 99.8% |
| | Weight retention | — | 97.0% | 97.5% | 97.5% | 98.5% | 99.0% | 99.6% | 99.1% | 99.6% |
| | Impregnation | — | Blank | Substantially slower | Equivalent | Equivalent | Equivalent | Equivalent | Equivalent | Equivalent |
| | Monomer dispersal | — | Blank | Equivalent | Intense monomer odor | Equivalent | Equivalent | Equivalent | Equivalent | Equivalent |

TABLE 2

| | Parameter | Units | Working Example 6 | Working Example 7 | Working Example 8 | Working Example 9 | Working Example 10 |
|---|---|---|---|---|---|---|---|
| Furan based resin (A) | Viscosity | mPa·s | 2000 | 2000 | 2000 | 2000 | 2000 |
| | Water content | — | 6% | 6% | 6% | 6% | 6% |
| | FA/FL content | — | 0.4% | 0.4% | 0.4% | 0.4% | 0.4% |
| Curing catalyst (B) | p-Toluenesulfonic acid, 65 wt % aqueous solution | phr | 1.0 | 0.5 | 1.0 | 1.0 | 1.0 |
| | Ethylamine hydrochloride, 40 wt % aqueous solution | phr | — | 1.0 | — | — | — |
| Additive (C) | Type | — | LiCl | LiCl | LiCl | LiCl | LiCl |
| | Solubility | g/100 g | 83.5 | 83.5 | 83.5 | 83.5 | 83.5 |
| | Addition method | — | 40 wt % aqueous solution | 40 wt % aqueous solution | 40 wt % aqueous solution | 40 wt % aqueous solution | 40 wt % aqueous solution |
| | Amt. added | phr | 5 | 5 | 5 | 5 | 5 |
| Filler | Type | — | — | — | Kaolin | Kaolin | Kaolin |
| | pH | — | — | — | 4.5 | 8.5 | 8.5 |
| | Surface treatment | — | — | — | None | Aminosilane | Aminosilane |
| Defoaming agent | Type | — | — | — | — | — | Silicone |
| Evaluation results | Dimensional retention | — | 99.8% | 99.8% | 99.9% | 99.9% | 99.9% |
| | Weight retention | — | 99.6% | 99.6% | 99.8% | 99.8% | 99.8% |
| | Pot life at 30° C. | hr | 28 | 72 | 28 | 28 | 28 |
| | Flexural modulus | MPa | 2600 | 2600 | 3200 | 3600 | 3800 |

As is clear from Table 1, in the comparison of Working Examples 1-5 and Comparative Examples 1-3, the Comparative Examples 1-3 do not meet the requirements of "addition of additives" that are a feature of the present invention, and they have unsatisfactory dimensional retention and weight retention. By contrast, Working Examples 1-5 have satisfactory dimensional retention and weight retention, and after curing it is clearly possible to obtain thermosetting furan resin compositions and furan resin laminated bodies with little dimensional change.

In addition, by comparing Working Examples 1-5 with Comparative Examples 2-3, for Working Examples 1-5 with viscosity, water content, and total content of residual furfuryl alcohol and furfural of the furan-based resin in the preferred ranges, the dimensional retention and weight retention are satisfactory, and there is a clear effect of increasing the impregnation and preventing monomer dispersal.

Furthermore, by comparing Working Examples 6 and 7, there is clearly an effect of prolonging the pot life, and by comparing Working Examples 6 and 8-10 there is clearly an increase in the flexural modulus.

According to the above-described thermosetting furan resin compositions, the effects are maintaining a more satisfactory impregnation, suppressing the increased deterioration of the working environment due to volatile monomers, maintaining a longer pot life, and it is possible to impart better mechanical properties.

Preparation of Thermosetting Furan Resin Compositions

Working Examples B1-B4

Based on 100 parts by weight of a furfuryl alcohol/formaldehyde condensation copolymer (viscosity: 2700 mPa·s; water content: 7.4 wt %), the amounts of additive (C) shown in Tables 3 and 4 were added, and this was stirred for 5 min at 1000 rpm using a Homogenizing Disper. After stirring, 4.0 parts by weight of a 50% aqueous solution of para-toluenesulfonic acid was added as the curing catalyst (B), and this was stirred at 1000 rpm for a further 5 min to obtain the thermosetting furan resin composition.

Working Examples B5-B6

Based on 100 parts by weight of a furfuryl alcohol/formaldehyde condensation copolymer (viscosity: 2700 mPa·s; water content: 7.4 wt %), an aqueous solution of the additive (C) prepared at a concentration (shown in Table 4) in the vicinity of the solubility at the working temperature (for example, approx. 20-30° C.) was added, and this was stirred for 5 min at 1000 rpm using a Homogenizing Disper. Furthermore, the amount of the additive added is shown in Table 4 as the amount of aqueous solution added. After stirring, 4.0 parts by weight of a 50% aqueous solution of para-toluenesulfonic acid was added as the curing catalyst (B), and this was stirred at 1000 rpm for a further 5 min to obtain the thermosetting furan resin composition.

Comparative Example B1

Based on 100 parts by weight of a furfuryl alcohol/formaldehyde condensation copolymer (viscosity: 2700 mPa·s; water content: 7.4 wt %), 4.0 parts by weight of a 50% aqueous solution of para-toluenesulfonic acid as the curing catalyst (B) was added, and this was stirred for 5 min at 1000 rpm to obtain the thermosetting furan resin composition.

(Molding the Furan Resin Laminated Body)

After the thermosetting furan resin composition described above (5500 g/m2) was impregnated uniformly onto a polyester non-woven substrate (thickness 5 mm, coating weight 1000 g/m2) using an impregnating roll, this was placed in a mold of inner dimensions 240 mm×240 mm×5 mm, and this was cured at 90° C. for 12 h to give the furan resin laminated body.

Evaluations were carried out to compare the furan resin laminated bodies obtained in the above-mentioned Working Examples B1-B6 and in Comparative Example B1. The evaluation results are shown in Table 3 and Table 4.

TABLE 3

|  | Working Example B1 | Working Example B2 | Working Example B3 | Working Example B4 |
|---|---|---|---|---|
| Thermosetting furan resin composition | | | | |
| Additive (C) | Sodium chloride | Lithium chloride | Sodium bromide | Lithium bromide |
| Addition method | Powder addition | Powder addition | Powder addition | Powder addition |
| Amt. added | 2.0 parts by weight | 2.0 parts by weight | 2.0 parts by weight | 2.0 parts by weight |
| Furan resin laminated body | | | | |
| Flexural modulus | 2800 MPa | 3000 MPa | 2700 MPa | 2800 MPa |
| Dimensional retention | 99.8% | 99.9% | 99.5% | 99.6% |
| Weight retention | 99.0% | 99.6% | 98.8% | 98.9% |

TABLE 4

|  | Working Example B5 | Working Example B6 | Comparative Example B1 |
|---|---|---|---|
| Thermosetting furan resin composition | | | |
| Additive (C) | Sodium chloride | Lithium chloride | — |
| Addition method | 20 wt % aqueous solution | 40 wt % aqueous solution | — |
| Amt. added | 10 parts by weight | 5 parts by weight | — |
| Furan resin laminated body | | | |
| Flexural modulus | 2600 MPa | 3000 MPa | 2400 MPa |
| Dimensional retention | 99.8% | 99.9% | 98.9% |
| Weight retention | 98.5% | 99.6% | 97.0% |

INDUSTRIAL APPLICABILITY

The thermosetting furan resin composition of the present invention can, after curing, provide a furan resin laminated body with little dimensional shrinkage, and since the thermosetting resin composition that is an effective matrix resin for laminated bodies such as FRPs and the like can be obtained easily with fewer steps, it has significant industrial utility.

The invention claimed is:

1. A thermosetting furan resin composition comprising:
   a furan based resin (A),
   a curing catalyst (B), and
   an additive (C) that is a normal salt comprising a strong acid and a strong base,
   wherein the additive (C) is at least one selected from the group consisting of sodium chloride, potassium chloride, lithium chloride, sodium bromide, potassium bromide, lithium bromide, sodium sulfate, potassium sulfate, lithium sulfate, sodium nitrate, potassium nitrate, and lithium nitrate, or a mixture thereof, and
   wherein the content of the additive (C) is 0.5-5 parts by weight based on the furan based resin (A) being 100 parts by weight.

2. The thermosetting furan resin composition according to claim 1, wherein
   the aforementioned additive (C) at 20° C. has a solubility in water of 30 g/100 g H2O or greater.

3. The thermosetting furan resin composition according to claim 1, wherein
   the water content of the aforementioned thermosetting furan resin composition is 15 wt % or less.

4. The thermosetting furan resin composition according to claim 1, wherein the aforementioned furan based resin (A) has a viscosity of 100-5000 mPa·s at 25° C.

5. The thermosetting furan resin composition according to claim 1, wherein
the aforementioned furan based resin (A) has a water content of 10 wt % or less, and total content of residual furfuryl alcohol and furfural is 1 wt % or less.

6. The thermosetting furan resin composition according to claim 1, wherein
the aforementioned curing catalyst (B) comprises a thermal reaction-type latent acid curing catalyst (B2) alone, or comprises a mixture of a manifest curing catalyst (B1) and the thermal reaction-type latent acid curing catalyst (B2).

7. The thermosetting furan resin composition according to claim 6, wherein
the aforementioned thermal reaction-type latent acid curing catalyst (B2) is of at least one type selected from the group consisting of inorganic ammonium salts, primary amine salts, secondary amine salts, and tertiary amine salts.

8. The thermosetting furan resin composition according to claim 7, wherein
the aforementioned thermal reaction-type latent acid curing catalyst (B2) is of at least one type selected from the group consisting of ammonium halides, ammonium sulfate, ammonium nitrate, methylammonium halides, dimethylammonium halides, ethylammonium halides, and diethylammonium halides.

9. The thermosetting furan resin composition according to claim 1, further comprising
5-100 parts by weight of inorganic filler based on the aforementioned furan based resin (A) being 100 parts by weight.

10. The thermosetting furan resin composition according to claim 9, wherein
the aforementioned inorganic filler has a pH of 10 or lower.

11. The thermosetting furan resin composition according to claim 9, wherein
the aforementioned inorganic filler has been subjected to an organosilane surface treatment.

12. The thermosetting furan resin composition according to claim 1, further comprising a defoaming agent.

13. A furan resin laminated body comprising:
a fibrous substrate, and
a cured body being cured after the fibrous substrate has been impregnated with the thermosetting furan resin composition according to claim 1.

14. The thermosetting furan resin composition according to claim 1,
wherein the furan based resin (A) has a water content of 10 wt % or less, a total content of residual furfuryl alcohol and furfural of 1 wt % or less, and a viscosity of 100-5000 mPa·s at 25° C., and
wherein the water content of the thermosetting furan resin composition is 15 wt % or less.

* * * * *